July 20, 1965  O. M. STUETZER  3,195,363
SELECTIVE DRIVING MEANS
Filed Feb. 9, 1962

INVENTOR.
OTMAR M. STUETZER
BY
Allen M. Sutton
ATTORNEY

United States Patent Office 3,195,363
Patented July 20, 1965

3,195,363
SELECTIVE DRIVING MEANS
Otmar M. Stuetzer, Hopkins, Minn., assignor, by mesne assignments, to Litton Systems, Inc., Beverly Hills, Calif., a corporation of Maryland
Filed Feb. 9, 1962, Ser. No. 172,245
10 Claims. (Cl. 74—210)

This invention relates to selective driving means and, more particularly, to selective driving means embodying an electrically operable clutch which may be adapted to transmit either rotational or rectilinear motion.

Types of selective driving means presently known generally embody parts which must be mechanically moved into or out of contact with each other to transmit motion selectively. This is disadvantageous in that such motion produces wear of the parts, and they must be periodically replaced. Furthermore, where elements must be physically moved into or out of contact with each other, there are generally limitations on the speed of operation and hence on the speed with which the driving means may be engaged and disengaged cyclically.

Accordingly, it is an object of the present invention to provide electrically operable selective driving means embodying a minimum of moving parts.

It is another object to provide such selective driving means which is capable of high speed operation.

It is a further object to provide selective driving means which may be energized manually or may be automatically energized cyclically at high speed.

It is a further object to provide such selective driving means which are characterized by simplicity of design, low cost of manufacture, and ease of maintenance.

In accordance with one aspect of the invention, a driving member and a driven member are so arranged that when the selective driving means is not energized, the driving member is in slipping, non-driven contact with the driven member. Ionizing means is provided adjacent the two members which, when energized, establishes a high electric field between the two members so that the driven member is positively engaged and driven by the driving member. The ionizing means may be energized either manually as desired or cyclically at high speeds by means of an automatically operated switch.

Figure 1:
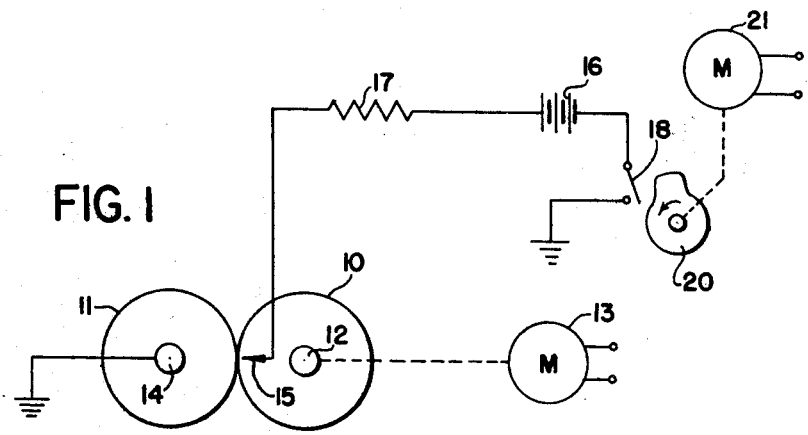
Figure 2:
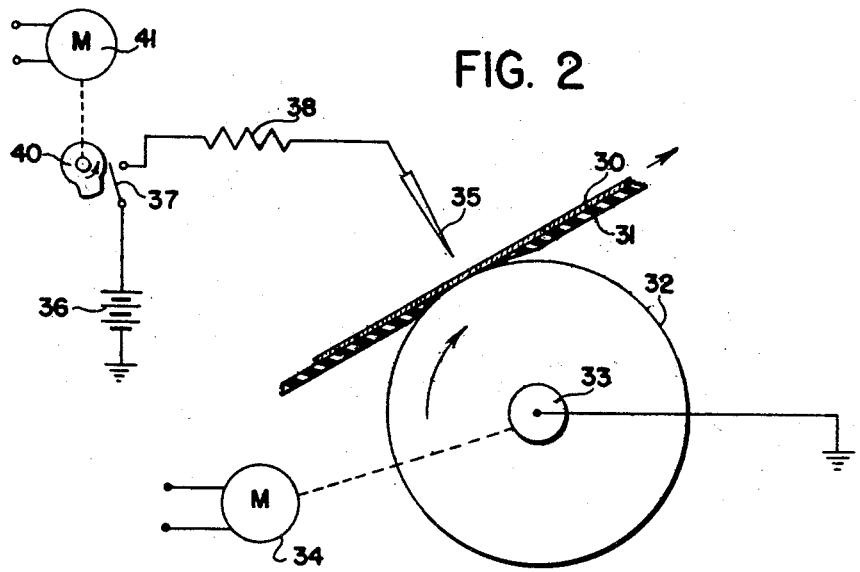

Further objects and advantages, together with a better understanding of the invention, will become apparent from the following description of two embodiments thereof, taken in conjunction with the accompanying drawings in which:

FIGURE 1 is a diagrammatic view of the selective driving means of the invention adapted to transmit rotational motion, and FIG. 2 is a diagrammatic view of another embodiment of the invention adapted to transmit rectilinear motion.

The embodiment shown in FIG. 1 of the selective driving means of the invention is adapted to transmit rotational motion between a driving member 10 and a driven member 11. The driving member 10 is cylindrical in shape and may be provided with a smooth, polished outer surface. It is rotatably mounted on a shaft 12, which may be mechanically rotated by suitable means, such as a motor 13 energized by conventional means (not shown). The driven member 11 is also of cylindrical shape and is provided with an outer surface which contacts the outer surface of the driving member 10 substantially along a line parallel to the shaft 12. The driven member 11 is mounted for rotation on a shaft 14 parallel to the rotational axis of the shaft 12, and may be connected to other apparatus or mechanisms that it is desired to drive.

In accordance with the invention, one of the members 10 or 11 is made of a conducting material, while the other is made of an insulating material. Alternatively, if it is more convenient to do so, both members may be made of a conducting material, and one of them provided with a surface coating of an insulating material. As illustrated, the driving member 10 is made of an insulating material or at least has its contacting peripheral surface so constructed. The driven member 11 is constructed of an electrically conductive material and is electrically grounded through the shaft 14.

When the selective driving means is unenergized, there is insufficient friction between the contacting surfaces of the driving member 10 and driven member 11 to cause the driven member to rotate. However, when the driving means is energized, force is created between the two contacting surfaces and the driving member 10 rotates the driven member 11.

The means for creating the force between the two contacting surfaces comprises ionizing means located adjacent the members 10 and 11. As illustrated, the ionizing means comprises a plurality of linearly disposed corona discharge points 15 (only one of which is shown) located inside the insulating driving member 10 and substantially on the same radius as the line of contact between the members 10 and 11. The corona points 15 are energized from a source of electrical potential 16 to which they are connected through a current limiting resistor 17. The circuit is completed through a switch 18, connected between the potential source 16 and ground.

The switch 18 is shown as operated by a cam 20, which in turn is driven by a motor 21, energized by conventional means (not shown). It is apparent, however, that the switch 18 may be operated manually if cyclic automatic operation is not desired.

In operation, when the corona discharge points 15 are energized, they ionize the air (or an ionizable protective noble gas) adjacent the members 10 and 11, spray charges on the member 10 to establish a surface charge and with it a high electric field between the members. When such a field exists between a conductor and an insulator, a strong force is established between the members and, if the driving member 10 is rotating, the force between its contacting surface and the contacting surface of the driven member 11 causes the driven member to rotate also. When the energizing circuit is broken, as by opening the switch 18, the electric field between the driving and driven members 10 and 11 collapses and their surfaces are no longer forced into contact. The electrical optential required of the source 16 must generally be determined empirically for various applications, but it has been found that a direct potential (either positive or negative) of the order of several thousand volts is sufficient in most applications. The current limiting resistor 17 is preferably of the order of $10^8$ ohms and the current flowing through the circuit is only a few microamperes.

If automatic cyclic operation is desired, the cam 20 may be selected to open and close the switch 18 in any desired manner and, of course, its speed of rotation may be controlled through the motor 21 or through gearing (not shown). Of course, the switch 18 and cam 20 may be replaced by other known suitable switching means such, for example, as an electronic switch.

It is pointed out that various modifications may be made to the apparatus shown in FIG. 1. For example, the number of corona points may be varied, as well as their spacing along the line of contact between the surfaces of the driving and driven members 10 and 11. The corona points may be located outside the members to spray charges on the insulating surface along its line of contact with the conductive surface. Of course, any charges sprayed on the conductive member do not contribute to establishing the electric field between the members. The potential of the source 16 may also be varied to control the strength of the electric field created between the members. It is also pointed out that the driving and driven members 10 and 11 may be of different diameters, so that a speed increase or decrease may be obtained as well as selective driving action.

If the driving member is made of a conductive material and the driven member is made of an insulating material, the ionizing means may be located inside the driven member. For efficient operation, it is preferred that the ionizing means be separated from the first member, which is conductive and forms part of the electrical circuit, by the second member which is non-conductive or has a non-conductive coating on its contacting surface.

FIG. 2 illustrates diagrammatically an embodiment of the invention adapted to selectively advance or drive a substantially flat strip or sheet of material 30 upwardly along an inclined plane 31 against the force of gravity. A cylindrical member 32, having a smooth outer surface, is mounted for rotation on a shaft 33. The shaft 33 may be rotated by a motor 34, which is energized by conventional means (not shown). The inclined surface 31 has an opening therein through which a portion of the cylindrical member 32 projects to contact the substantially flat member 30.

When the driving means is unenergized, the friction between the substantially flat member 30 and the driving member 32 is insufficient to overcome the force of gravity and advance the member 30 along the inclined plane 31. In order to overcome the force of gravity and cause the member 30 to be advanced upwardly along the inclined plane, ionizing means is provided which in the present case, comprises one or more corona discharge points 35. The corona point 35 is connected to one side of a unidirectional source of potential 36 through a switch 37 and a current limiting resistor 38. The other side of the source 36 is grounded, as is the cylindrical driving member 32 which, in the present case, is made of an electrically conductive material. The switch 37 may be operated by a cam 40, which is driven by a motor 41 energized in the usual manner.

In the embodiment shown in FIG. 2, the material 30 which is being advanced and the inclined plane 31 are shown as insulators, while the driving member 32 is a conductor. However, the invention also contemplates that the driven material 30 might be a conductor, while the driving member 32 might be made of an insulating material or have an insulating coating on its outer surface. In that case, the corona point 35 could be located inside the cylinder 32, as is shown in the embodiment of FIG. 1, and the driven material grounded through a conductive inclined plane. The two arrangements operate in substantially the same manner.

In operation, when the switch 37 is closed, the air or ionizable noble gas is ionized in the vicinity of the line of contact between the members 30 and 32, and charges are sprayed onto the member 30. The high electric field established creates force between the surface of the member 30 and the contacting surface of the driving member 32, and friction between the two surfaces causes the member 30 to be advanced up the inclined plane 31. The switch 37 may be manually operated to cause either continuous or intermittent advancement of the material 30. If desired, the cam 40 and its speed of rotation may be so chosen as to advance the material 30 in successive steps. Such an arrangement might be useful if the material 30 is being fed to another device for use in a manufacturing or other operation. Again, as in the case shown in FIG. 1, the switch 37 and cam 40 may be replaced by other automatic circuit closing means.

As in the embodiment illustrated in FIG. 1, various arrangements in the number and spacing of corona points are possible. Also, the potential of the source 36 may be varied, but is generally of the order of several thousand volts. The current limiting resistor 38 of the order of $10^8$ ohms, so that only a few microamperes of current flow in the circuit.

It is now apparent that the selective driving means of the invention may be utilized in a multitude of applications. It may be energized manually for relatively long periods of operation, or it may be energized cyclically at high speed through the use of a cam-operated switch. It embodies a minimum of moving parts in attaining the objectives set forth above.

It is apparent that many modifications may be made without departing from the true spirit and scope of the invention.

What is claimed is:

1. Selective driving means comprising a first member, a second member in surface slipping engagement along a single line of surface to surface contact with, and adapted to be driven by said first member, ionizing means adjacent but free from physical connection to at least one of said members, and means for energizing said ionizing means to establish a surface charge and with it an electric field between said members by spraying unipolar electrical charges on said one of said members, said second member being positively engaged and driven by said first member only while said ionizing means is energized.

2. Selective driving means comprising a first member, a second member in surface slipping engagement along a single line of surface to surface contact with, and adapted to be driven by said first member, one of said members being a conductor and the other insulated therefrom, ionizing means adjacent but free from physical contact with said insulated member, and means for energizing said ionizing means to establish an electric field between said members by spraying unipolar electrical charges on said insulated member, said second member being positively engaged and driven by said first member only while said ionizing means is energized.

3. Selective driving means comprising a rotatable cylindrical first member, a rotatable cylindrical second member in surface sliding contact therewith and adapted to be rotated by said first member, one of said members having an insulating contacting surface and the other having a conductive contacting surface, ionizing means located inside the cylindrical member having the insulating surface but free from physical connection to said insulating surface and adjacent a point of contact with the other member, means for rotating said first member, and means for selectively energizing said ionizing means for spraying unipolar electrical charges on said insulating surface, said second member being positively engaged and driven by said first member only when said ionizing means is energized.

4. The apparatus defined by claim 3 wherein said ionizing means comprises corona discharge means.

5. The apparatus defined by claim 3 wherein said selective energizing means comprises a source of electrical potential connected between said ionizing means and said conductive surface through automatically operated switch means.

6. The apparatus defined by claim 4 wherein said selective energizing means comprises a source of electrical potential connected between said corona discharge means and said conductive surface through a switch.

7. Selective driving means comprising a rotatable cylindrical member, a substantially flat member positioned to be slidably contacted and selectively advanced frictionally by said rotatable member, said substantially flat member being so positioned that force of gravity normally prevents its advancement, one of said members being a conductor and the other being insulated therefrom, ionizing means positioned adjacent but free from physical connection to the insulated member, means for rotating said rotatable member, and means for selectively energizing said ionizing means to establish an electric field between said members by spraying unipolar electrical charge on said other member, said substantially flat member being positively engaged and advanced by said rotatable member only when said ionizing means is energized.

8. The apparatus defined by claim 7 wherein said substantially flat member is supported by an inclined plane having an opening therein through which a portion of said rotatable cylindrical member projects to contact said substantially flat member.

9. The apparatus defined by claim 8 wherein said ionizing means comprises corona discharge means.

10. The apparatus defined by claim 9 wherein said selectively energizing means comprises a source of electrical potential connected between said corona discharge means and said conductor member through automatically operated switch means.

References Cited by the Examiner

UNITED STATES PATENTS

| | | |
|---|---|---|
| 831,685 | 9/06 | Rossman _____ 74—210 X |
| 2,025,123 | 12/35 | Rahbek. |
| 2,148,482 | 2/39 | Lorenz. |
| 2,545,354 | 3/51 | Hansen _____ 310—5 |
| 2,568,824 | 9/51 | Rahbek. |
| 2,684,902 | 7/54 | Mayo et al. _____ 317—262 X |
| 2,803,968 | 8/57 | Van Tilburg _____ 74—210 X |
| 2,811,465 | 10/57 | Greig. |
| 2,850,907 | 9/58 | Foster. |
| 2,850,908 | 9/58 | Foster. |
| 2,897,425 | 7/59 | Waring. |
| 2,916,920 | 12/59 | Planer et al. _____ 74—25 X |
| 2,923,390 | 2/60 | Fitch _____ 317—262 X |
| 2,960,610 | 11/60 | Gale _____ 310—5 |
| 2,980,834 | 4/61 | Tregay et al. _____ 317—262 |
| 3,011,435 | 12/61 | Jones et al. _____ 317—262 X |
| 3,132,267 | 5/64 | Schaffert _____ 310—5 |

FOREIGN PATENTS

| | | |
|---|---|---|
| 1,147,162 | 11/57 | France. |
| 776,310 | 6/57 | Great Britain. |

BROUGHTON G. DURHAM, *Primary Examiner.*

DON A. WAITE, *Examiner.*